(12) United States Patent
Moon et al.

(10) Patent No.: US 7,680,207 B2
(45) Date of Patent: Mar. 16, 2010

(54) MOBILE COMMUNICATION SYSTEM, MOBILE COMMUNICATION METHOD, AND RADIO STATION SUITABLY USED FOR THE SAME

(75) Inventors: Sung Uk Moon, Yokosuka (JP); Takehiro Nakamura, Yokosuka (JP); Minami Ishii, Yokohama (JP); Masafumi Usuda, Yokosuka (JP); Mayu Yamada, Yokohama (JP); Akihito Hanaki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1403 days.

(21) Appl. No.: 10/678,107

(22) Filed: Oct. 6, 2003

(65) Prior Publication Data

US 2004/0121788 A1    Jun. 24, 2004

(30) Foreign Application Priority Data

Oct. 4, 2002  (JP) .............................. 2002-292792
Nov. 5, 2002  (JP) .............................. 2002-321870

(51) Int. Cl.
*H04L 27/00*  (2006.01)
*H04B 17/00*  (2006.01)
*H04B 7/00*  (2006.01)

(52) U.S. Cl. ................. 375/295; 455/67.13; 455/452.1; 455/513

(58) Field of Classification Search ................. 375/295; 370/332; 455/67.11, 67.13, 452.1, 452.2, 455/456.1, 69, 502, 513, 560, 517
See application file for complete search history.

(56) References Cited

U.S. PATENT DOCUMENTS 5,701,294 A    12/1997  Ward et al.

| 6,360,076 | B1* | 3/2002 | Segura et al. ............ 455/67.11 |
| 6,385,183 | B1* | 5/2002 | Takeo ......................... 370/335 |
| 6,414,948 | B1* | 7/2002 | Sato ............................ 370/335 |
| 6,738,639 | B1* | 5/2004 | Gosselin ...................... 455/519 |
| 6,792,273 | B1* | 9/2004 | Tellinger et al. ............ 455/442 |
| 6,983,409 | B1* | 1/2006 | Vollmer et al. .............. 714/748 |
| 2002/0003798 | A1* | 1/2002 | Sato et al. ................... 370/390 |
| 2002/0098860 | A1* | 7/2002 | Pecen et al. ................. 455/522 |

(Continued)

FOREIGN PATENT DOCUMENTS

CN    1209710    3/1999

(Continued)

*Primary Examiner*—Chieh M Fan
*Assistant Examiner*—Aristocratis Fotakis
(74) *Attorney, Agent, or Firm*—Oblon, Spivak, McClelland, Maier & Neustadt, L.L.P.

(57) ABSTRACT

The object of the present invention is provide a mobile communication system which can improve a communication quality of the mobile communication system as a whole by changing a transmission method for transmitting common information. Each of the mobile stations 200a to 200l comprises a communication quality measurer 230 configured to measure a communication quality of a signal transmitted from the radio station 100a. The radio station 100a comprises a communication quality acquirer 130 configured to acquire the communication quality from the plurality of mobile stations 200a to 200l; a transmission method changer 140 configured to change a transmission method for at least one of an error encoding rate, the number of repeated bits, an interleave length, the number of multiple codes and the number of transmission signal repetitions, in accordance with the acquired communication quality; and a transmitter 110 configured to transmit the signal to the plurality of mobile stations 200a to 200l using the changed transmission method.

8 Claims, 4 Drawing Sheets

U.S. PATENT DOCUMENTS

| | | | |
|---|---|---|---|
| 2002/0106989 A1* | 8/2002 | Aizawa et al. | 455/67.1 |
| 2002/0123349 A1* | 9/2002 | Miyoshi et al. | 455/450 |
| 2003/0012195 A1* | 1/2003 | Ohkubo et al. | 370/390 |
| 2003/0054807 A1* | 3/2003 | Hsu et al. | 455/414 |
| 2003/0074256 A1* | 4/2003 | LaCroix | 705/14 |
| 2003/0119452 A1* | 6/2003 | Kim et al. | 455/69 |
| 2003/0162512 A1 | 8/2003 | Lauterbach et al. | |
| 2003/0200499 A1* | 10/2003 | Khayrallah | 714/776 |
| 2004/0203476 A1* | 10/2004 | Liu | 455/69 |
| 2004/0224677 A1* | 11/2004 | Kuchibhotla et al. | 455/422.1 |

FOREIGN PATENT DOCUMENTS

| | | |
|---|---|---|
| DE | 100 35 041 | 2/2002 |
| EP | 1 154 660 | 11/2001 |
| EP | 1 185 033 | 3/2002 |
| JP | 5-130002 | 5/1993 |
| JP | 11-18131 | 1/1999 |
| JP | 2001-189693 | 7/2001 |
| JP | 2001-292096 | 10/2001 |
| JP | 2001-320324 | 11/2001 |
| JP | 2002-101043 | 4/2002 |
| WO | WO 01/78324 A1 | 10/2001 |

* cited by examiner

FIG.4

| MOBILE STATION | RECEIVED POWER (dBm) | SIGNAL ERROR RATE (%) | INTERFERENCE SIGNAL LEVEL | SIGNAL-TO-INTERFERENCE RATIO |
|---|---|---|---|---|
| 200a | −50 | 0.001 | −110 | 11 |
| 200b | −45 | 0.002 | −130 | 12 |
| 200c | −45 | 0.003 | −110 | 13 |
| 200d | −50 | | −110 | 11 |
| 200e | −50 | 0.003 | −120 | 10 |
| 200f | −65 | 0.004 | −100 | 14 |
| 200g | −60 | 0.00 | −110 | 12 |
| 200h | −45 | 0.002 | −120 | 13 |
| 200i | −50 | 0.001 | −130 | 12 |
| 200j | −45 | 0.004 | −100 | 14 |

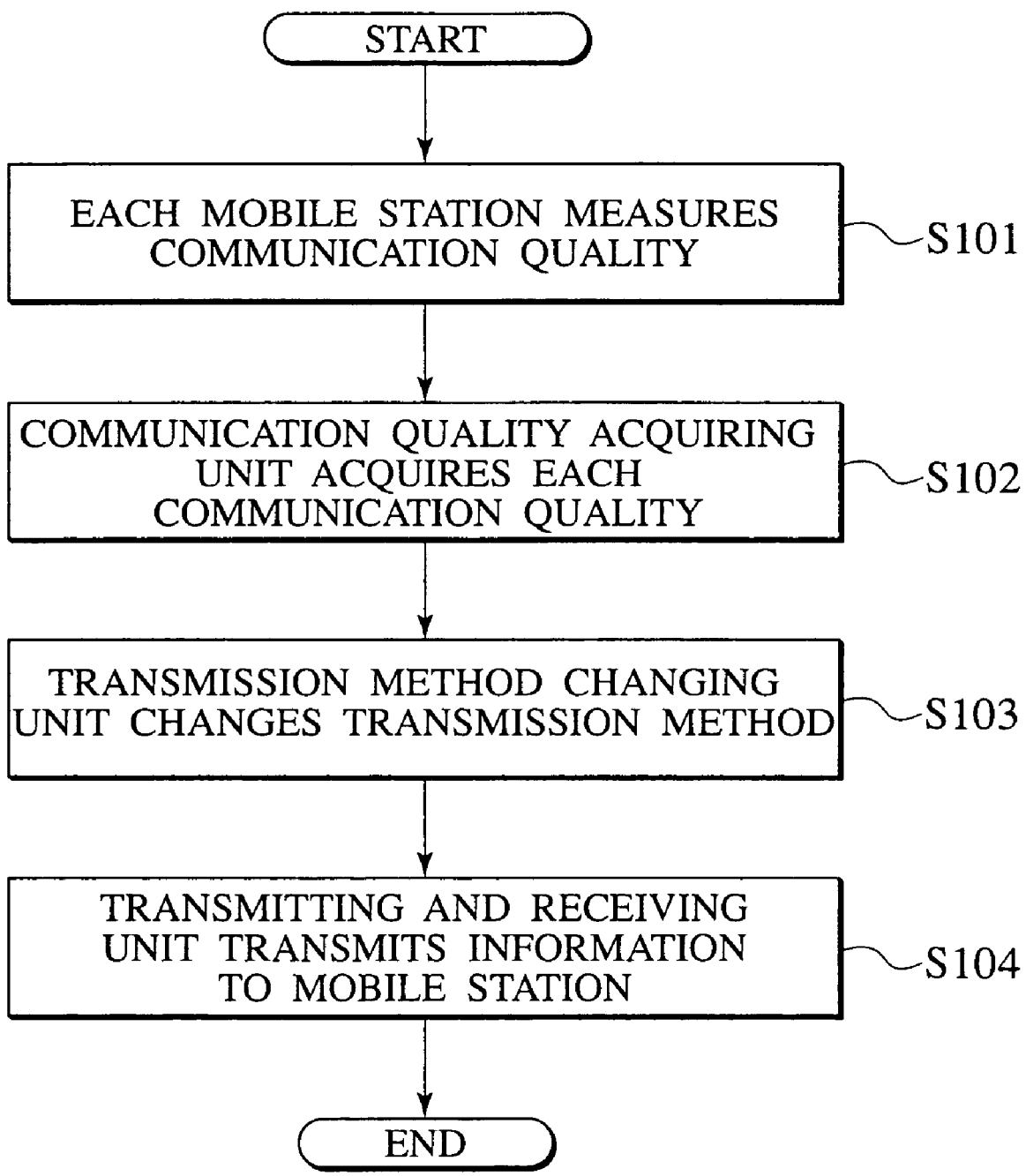

MOBILE COMMUNICATION SYSTEM, MOBILE COMMUNICATION METHOD, AND RADIO STATION SUITABLY USED FOR THE SAME

CROSS REFERENCE TO RELATED APPLICATION

This application is based upon and claims the benefit of priority from the prior Japanese Patent Application No. P2002-292792, filed on Oct. 4, 2002; and P2002-321870, filed on Nov. 5, 2002; the entire contents of which are incorporated herein by reference.

BACKGROUND OF THE INVENTION

1. Field of the Invention

The present invention relates to a mobile communication system for carrying out multicast communication by a radio station (a radio control unit or a base station) and a plurality of mobile stations, a mobile communication method, and a radio station suitably used for the same.

Specifically, the present invention relates to a mobile communication system in which a specific base station transmits common information to a plurality of mobile stations, a mobile communication method, and a radio station suitably used for the same.

2. Description of the Related Art

As shown in FIG. 1, broadcast communication whereby one or a plurality of base stations 100a to 100g transmit common information to unspecified mobile stations 200a to 200l in predetermined areas 300a to 300g all at once is known in a conventional mobile communication system.

As shown in FIG. 2, multicast communication whereby one or a plurality of base stations 100a to 100g transmit common information to a plurality of mobile stations joining in (belonging to) a specific group in predetermined areas 300a to 300l all at once is known in a conventional mobile communication system.

However, there is a problem in that communication quality varies from one mobile station to another, so that it is impossible to satisfy desired communication quality at certain mobile stations in the conventional mobile communication systems.

For example, a mobile station located near the base station can obtain better communication quality than other mobile stations. However, other mobile stations can obtain only poor communication quality compared with the mobile station located near the base station.

In other words, there is a problem in that communication quality changes depending on a positional relationship between the base station and each of the mobile stations existing within the same area, so that the communication quality is not uniform among the mobile stations. Therefore, there has been demand for development of a mobile communication system which can provide desired communication quality to all the mobile stations existing within the same area.

BRIEF SUMMARY OF THE INVENTION

In view of the foregoing, it is an object of the present invention to provide a mobile communication system which can approximate communication quality of each mobile station to desired communication quality, by changing a transmission method for transmitting common information in consideration of a balance of communication quality among mobile stations, and improve a communication quality of the mobile communication system as a whole, a mobile communication method, and a radio station suitably used for the same.

A first aspect of the present invention is summarized as a mobile communication system which carries out multicast communication by a radio station and a plurality of mobile stations.

Each of the mobile stations comprises a communication quality measurer configured to measure a communication quality of a signal transmitted from the radio station.

The radio station comprises: a communication quality acquirer configured to acquire the communication quality from the plurality of mobile stations; a transmission method changer configured to change a transmission method for at least one of an error encoding rate, the number of repeated bits, an interleave length, the number of multiple codes and the number of transmission signal repetitions, in accordance with the acquired communication quality; and a transmitter configured to transmit the signal to the plurality of mobile stations using the changed transmission method.

A second aspect of the present invention is summarized as a radio station for carrying out multicast communication with a plurality of mobile stations.

The radio station comprises: a communication quality acquirer configured to acquire a communication quality of a signal transmitted from the plurality of mobile stations using multicast communication; a transmission method changer configured to change a transmission method for at least one of an error encoding rate, the number of repeated bits, an interleave length, the number of multiple codes and the number of transmission signal repetitions, in accordance with the acquired communication quality; and a transmitter configured to transmit the signal to the plurality of mobile stations using the changed transmission method.

In the second aspect, the communication quality acquirer may select the lowest communication quality from among the acquired communication qualities, and the transmission method changer may change the transmission method in accordance with the selected lowest communication quality.

In the second aspect, the communication quality acquirer may calculate an average value of the communication qualities acquired from the plurality of mobile stations, and the transmission method changer may change the transmission method in accordance with a difference between the calculated average value and a preset reference value.

In the second aspect, the radio station may further comprise a radio resource manager configured to manage a situation of a radio resource, and the transmission method changer may change the transmission method in accordance with the acquired communication quality and the situation of a radio resource.

In the second aspect, the communication quality may include at least one of a received power, a signal error rate, an interference signal level and a signal-to-interference ratio.

A third aspect of the present invention is summarized as a mobile communication method for carrying out multicast communication by a radio station and a plurality of mobile stations.

The method comprises the steps of: (A) measuring a communication quality of a signal transmitted from the radio station, in each of the mobile stations; (B) acquiring the communication quality from the plurality of mobile stations, in the radio station; (C) changing a transmission method for at least one of an error encoding rate, the number of repeated bits, an interleave length, the number of multiple codes and the number of transmission signal repetitions, in accordance with the acquired communication quality, in the radio station; and (D) transmitting the signal to the plurality of mobile stations using the changed transmission method, in the radio station.

BRIEF DESCRIPTION OF THE SEVERAL VIEWS OF THE DRAWINGS

FIG. 4 is a diagram showing stored contents of a communication quality database used for the mobile communication system according to the embodiment of the present invention.

FIG. 5 is a flowchart showing the operation of the mobile communication system according to the embodiment of the present invention.

DETAILED DESCRIPTION OF THE INVENTION

Figure 1:
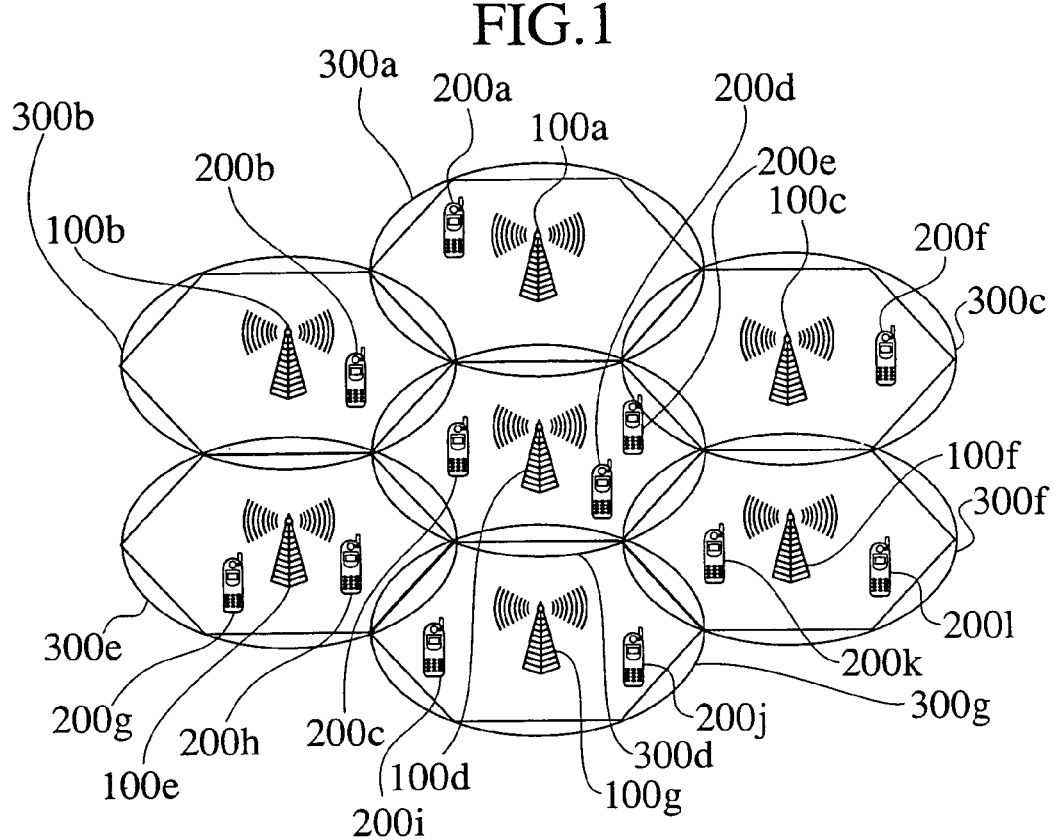
FIG. 1 is a diagram showing an entire configuration of a mobile communication system for carrying out broadcast communication according to a prior art.
Figure 2:
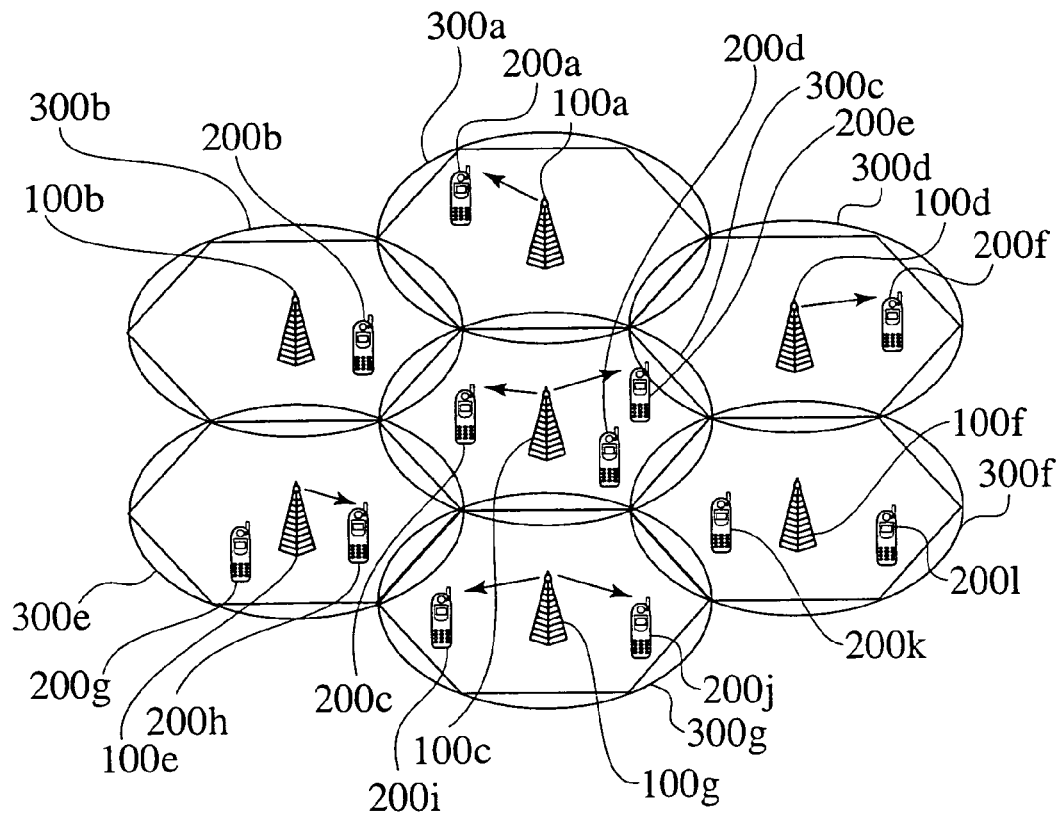
FIG. 2 is a diagram showing an entire configuration of a mobile communication system for carrying out multicast communication according to a prior art.
Figure 3:
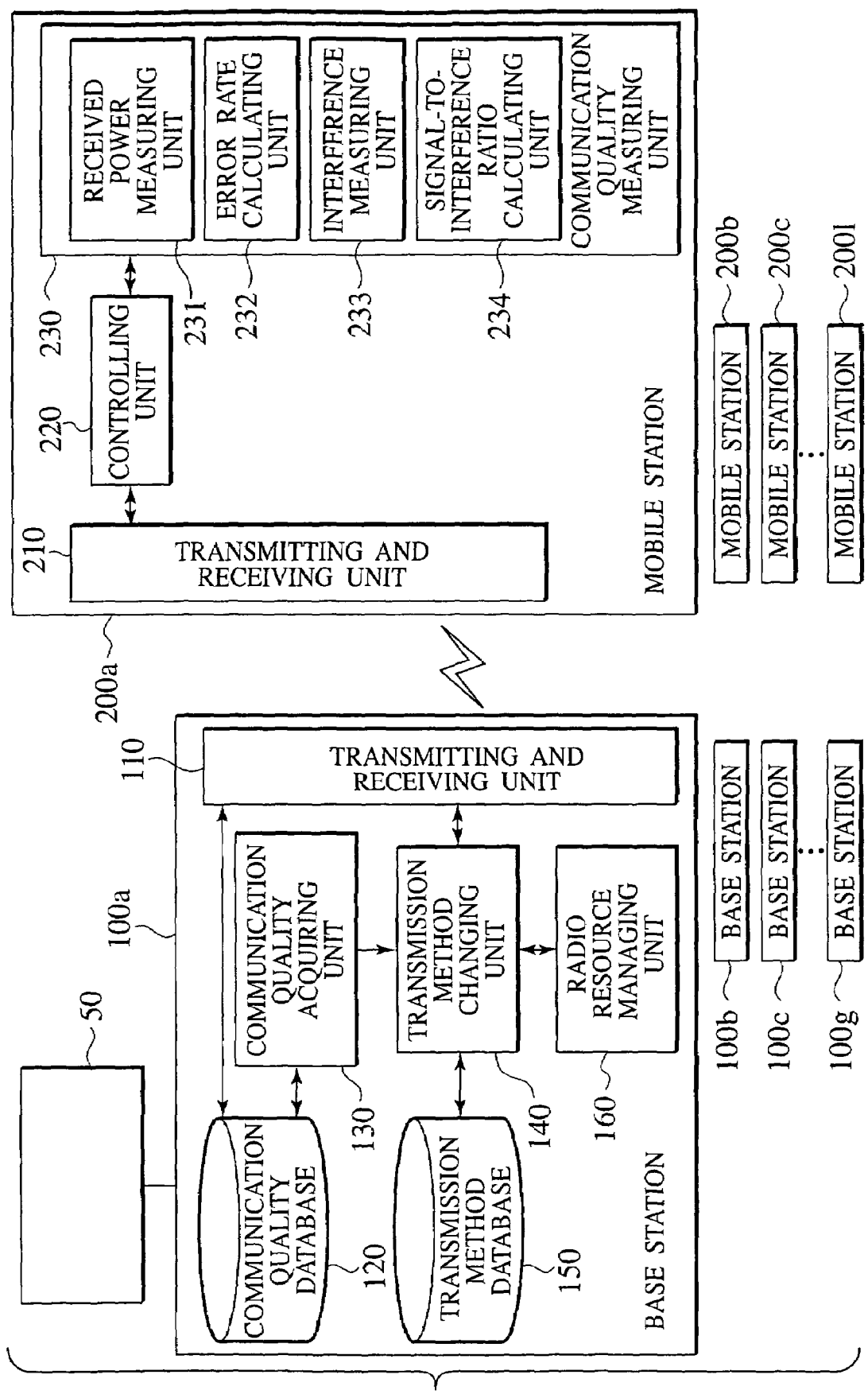
FIG. 3 is a diagram showing functional blocks of a mobile communication system according to an embodiment of the present invention.

A Configuration of a Mobile Communication System According to an Embodiment of the Present Invention A mobile communication system according to the present invention will be described with reference to the accompanying drawings. FIG. 3 is a schematic configuration diagram of the mobile communication system according to an embodiment of the present invention.

The mobile communication system according to the embodiment carries out multicast communication (including broadcast communication) in which base stations $100a$ to $100g$ transmit common information to mobile stations $200a$ to $200l$ existing within areas $300a$ to $300g$. Herein, the areas $300a$ to $300g$ are managed by the base stations $100a$ to $100g$, respectively.

In the embodiment, the base stations $100a$ to $100g$ may transmit common information to the mobile stations $200a$ to $200l$ joining in (belonging to) the predetermined multicast group over the plurality of areas $300a$ to $300g$.

Moreover, in the embodiment, the base station $100a$ may transmit common information to the mobile station $200a$ joining in the predetermined multicast group in a single area $300a$.

The present embodiment will be described on the former premise. However, as a matter of course, the present invention can also be applied to the latter.

Since the functions of the mobile stations $200a$ to $200l$ are basically the same, the function of the mobile station $200a$ will be described hereinafter. The functions of the base stations $100a$ to $100g$ are basically the same, and thus the function of the base station $100a$ will be described hereinafter.

In the embodiment, as shown in FIG. 3, the mobile station $200a$ is configured with a transmitting and receiving unit 210, a controlling unit 220, and a communication quality measuring unit 230.

The transmitting and receiving unit 210 is configured to transmit and receive a signal to and from the base stations $100a$ to $100g$.

Specifically, the transmitting and receiving unit 210 receives signals transmitted from the base stations $100a$ to $100g$. The transmitting and receiving unit 210 transmits communication quality of the signals measured by the communication quality measuring unit 230, to the base stations $100a$ to $100g$.

The controlling unit 220 is configured to control each function of the mobile station $200a$.

The communication quality measuring unit 230 is configured to measure the communication quality of the signals transmitted from the base stations $100a$ to $100g$. In the embodiment, the communication quality includes at least one of received power, a signal error rate, an interference signal level, and a signal-to-interference ratio (SIR).

As shown in FIG. 3, the communication quality measuring unit 230 is configured with a received power measuring unit 231, a signal error rate measuring unit 232, an interference signal level measuring unit 233, and a signal-to-interference ratio measuring unit 234. The communication quality measuring unit 230 may comprise all of these functions, or one of these functions.

The received power measuring unit 231 is configured to measure received power of the signals received from the base stations $100a$ to $100g$.

The signal error rate measuring unit 232 is configured to measure a signal error rate of the signals received from the base stations $100a$ to $100g$.

The interference signal level measuring unit 233 is configured to measure the level of an interference signal which is contained in each of the signals received from the base stations $100a$ to $100g$. Herein, the interference signal level includes the level of the interference signal from the base stations $100a$ to $100g$, the level of the interference signal from other mobile stations $200b$ to $200l$, etc.

The signal-to-interference ratio measuring unit 234 is configured to measure a ratio of the signal obtained from each of the base stations $100a$ to $100g$ to an interference signal level (SIR: signal-to-interference ratio).

The communication quality measuring unit 230 transmits the measured communication quality to a transmitting and receiving unit 110 of the base stations $100a$ to $100g$ through the transmitting and receiving unit 210.

As shown in FIG. 3, the base station $100a$ is configured with the transmitting and receiving unit 110, a communication quality database 120, a communication quality acquiring unit 130, a transmission method changing unit 140, a transmission information database 150, and a radio resource managing unit 160.

The transmitting and receiving unit 110 is configured to transmit and receive signals to and from the mobile stations $200a$ to $200l$ using a transmission method whish is changed by the transmission method changing unit 140. Additionally, the transmitting and receiving unit 110 is configured to transmit and receive signals to and from the radio network controller 50.

Specifically, the transmitting and receiving unit 110 receives communication quality transmitted from each of the mobile stations $200a$ to $200l$ and stores the received communication quality in the communication quality database 120. Herein, the communication quality is measured by the communication quality measuring unit 230 of each of the mobile stations $200a$ to $200l$.

The communication quality database 120 is configured to store the communication quality measured at each of the mobile stations $200a$ to $200l$.

Specifically, as shown in FIG. 4, the communication quality database 120 stores "received powers (−50 dBm, 45 dBm, −45 dBm or the like)," "signal error rates (0.001%, 0.002%, 0.003% or the like)," interference signal levels (−110, −130, −110 or the like), and "signal-to-interference ratios (11, 12, 13 or the like)" of the mobile stations 200a to 200l.

The communication quality acquiring unit 130 is configured to acquire the communication quality stored in the communication quality database 120 and transmit the communication quality to the acquired transmission method changing unit 140.

Specifically, the communication quality acquiring unit 130 refers to the communication quality database 120 to select at least one of a plurality of communication qualities for a mobile station joining in a specific multicast group, and outputs the selected communication quality to the transmission method changing unit 140.

Herein, the communication quality acquiring unit 130 can select a predetermined communication quality, e.g., "received power," "signal error rate," "interference signal level," or "signal-to-interference ratio" from the communication qualities stored in the communication quality database 120.

The communication quality acquiring unit 130 can select a communication quality of a predetermined mobile station, e.g., a communication quality of a mobile station joining in a specific multicast group.

For example, when "received power" is selected as the communication quality, the communication quality acquiring unit 130 selects the highest (largest) or lowest (smallest) received power from among received powers corresponding to each of the mobile stations joining in the specific multicast group, and outputs the selected received power and an ID of a mobile station corresponding to the selected received power, to the transmission method changing unit 140.

The communication quality acquiring unit 130 may calculate an average value of the received powers of the mobile stations joining in the specific multicast group, and output the calculated average value and IDs of the mobile stations joining in the specific multicast group, to the transmission method changing unit 140.

Only when the calculated average value exceeds a predetermined value, the communication quality acquiring unit 130 may output the average value and the IDs of the mobile stations joining in the specific multicast group, to the transmission method changing unit 140.

The communication quality acquiring unit 130 may calculate the variation within a predetermined period in the lowest received power selected from among the received powers of the mobile stations joining in the specific multicast group, and output the calculated variation and an ID of a mobile station corresponding to the lowest received power, to the transmission method changing unit 140.

Only when the variation exceeds a predetermined value, the communication quality acquiring unit 130 may output the variation to the transmission method changing unit 140.

The communication quality acquiring unit 130 can set the average value or the lowest received power as a reference value, and output the received power in which a difference from the reference value is in a predetermined range and an ID of a mobile station corresponding to the received power, to the transmission method changing unit 140.

The communication quality acquiring unit 130 can set the average value or the lowest received power as a reference value, and output an ID of a mobile station extracted by using an optional method with the reference value and the received power of the extracted mobile station, to the transmission method changing unit 140.

For example, the communication quality acquiring unit 130 can extract the number N of mobile stations selected in sequence from a mobile station of the smallest received power, the number N of mobile stations selected in sequence from a mobile station whose received power is closest to an average value, a mobile station with an N-th smallest received power.

In addition, only when the number of mobile stations corresponding to the received power in which a difference from the reference value is in the predetermined range exceeds a predetermined number, the communication quality acquiring unit 130 may output the received power and the ID of the mobile station corresponding to the received power, to the transmission method changing unit 140.

For example, when "signal error rate" is selected as the communication quality, the communication quality acquiring unit 130 selects the highest (smallest) or lowest (largest) signal error rate from among signal error rates corresponding to each of the mobile stations joining in the specific multicast group, and outputs the selected signal error rate and an ID of a mobile station corresponding to the selected signal error rate, to the transmission method changing unit 140.

The communication quality acquiring unit 130 may calculate an average value of the signal error rates of the mobile stations joining in the specific multicast group, and output the calculated average value and IDs of the mobile stations joining in the specific multicast group, to the transmission method changing unit 140.

Only when the calculated average value exceeds a predetermined value, the communication quality acquiring unit 130 may output the average value and the IDs of the mobile stations joining in the specific multicast group, to the transmission method changing unit 140.

The communication quality acquiring unit 130 may calculate the variation within a predetermined period in the lowest signal error rate selected from among the signal error rates of the mobile stations joining in the specific multicast group, and output the calculated variation and an ID of a mobile station corresponding to the lowest signal error rate, to the transmission method changing unit 140.

Only when the variation exceeds a predetermined value, the communication quality acquiring unit 130 may output the variation to the transmission method changing unit 140.

The communication quality acquiring unit 130 can set the average value or the lowest signal error rate as a reference value, and output the signal error rate in which a difference from the reference value is in a predetermined range and an ID of a mobile station corresponding to the signal error rate, to the transmission method changing unit 140.

The communication quality acquiring unit 130 can set the average value or the lowest signal error rate as a reference value, and output an ID of a mobile station extracted by using an optional method with the reference value and the signal error rate of the extracted mobile station, to the transmission method changing unit 140.

For example, the communication quality acquiring unit 130 can extract the number N of mobile stations selected in sequence from a mobile station of the smallest signal error rate, the number N of mobile stations selected in sequence from a mobile station whose signal error rate is closest to an average value, a mobile station with an N-th smallest signal error rate.

In addition, only when the number of mobile stations corresponding to the signal error rate in which a difference from the reference value is in the predetermined range exceeds a predetermined number, the communication quality acquiring unit 130 may output the signal error rate and the ID of the mobile station corresponding to the signal error rate, to the transmission method changing unit 140.

For example, when "interference signal level" is selected as the communication quality, the communication quality acquiring unit 130 selects the highest (smallest) or lowest (largest) interference signal level from among interference signal levels corresponding to each of the mobile stations joining in the specific multicast group, and outputs the selected interference signal level and an ID of a mobile station corresponding to the selected interference signal level, to the transmission method changing unit 140.

The communication quality acquiring unit 130 may calculate an average value of the interference signal levels of the mobile stations joining in the specific multicast group, and output the calculated average value and IDs of the mobile stations joining in the specific multicast group, to the transmission method changing unit 140.

Only when the calculated average value exceeds a predetermined value, the communication quality acquiring unit 130 may output the average value and the IDs of the mobile stations joining in the specific multicast group, to the transmission method changing unit 140.

The communication quality acquiring unit 130 may calculate the variation within a predetermined period in the lowest interference signal level selected from among the interference signal levels of the mobile stations joining in the specific multicast group, and output the calculated variation and an ID of a mobile station corresponding to the lowest interference signal level, to the transmission method changing unit 140.

Only when the variation exceeds a predetermined value, the communication quality acquiring unit 130 may output the variation to the transmission method changing unit 140.

The communication quality acquiring unit 130 can set the average value or the lowest interference signal level as a reference value, and output the interference signal level in which a difference from the reference value is in a predetermined range and an ID of a mobile station corresponding to the interference signal level, to the transmission method changing unit 140.

The communication quality acquiring unit 130 can set the average value or the lowest interference signal level as a reference value, and output an ID of a mobile station extracted by using an optional method with the reference value and the interference signal level of the extracted mobile station, to the transmission method changing unit 140.

For example, the communication quality acquiring unit 130 can extract the number N of mobile stations selected in sequence from a mobile station of the smallest interference signal level, the number N of mobile stations selected in sequence from a mobile station whose interference signal level is closest to an average value, a mobile station with an N-th smallest interference signal level.

In addition, only when the number of mobile stations corresponding to the interference signal level in which a difference from the reference value is in the predetermined range exceeds a predetermined number, the communication quality acquiring unit 130 may output the interference signal level and the ID of the mobile station corresponding to the interference signal level, to the transmission method changing unit 140.

For example, when "signal-to-interference ratio" is selected as the communication quality, the communication quality acquiring unit 130 selects the highest (largest) or lowest (smallest) signal-to-interference ratio from among signal-to-interference ratios corresponding to each of the mobile stations joining in the specific multicast group, and outputs the selected signal-to-interference ratio and an ID of a mobile station corresponding to the selected signal-to-interference ratio, to the transmission method changing unit 140.

The communication quality acquiring unit 130 may calculate an average value of the signal-to-interference ratios of the mobile stations joining in the specific multicast group, and output the calculated average value and IDs of the mobile stations joining in the specific multicast group, to the transmission method changing unit 140.

Only when the calculated average value exceeds a predetermined value, the communication quality acquiring unit 130 may output the average value and the IDs of the mobile stations joining in the specific multicast group, to the transmission method changing unit 140.

The communication quality acquiring unit 130 may calculate the variation within a predetermined period in the lowest signal-to-interference ratio selected from among the signal-to-interference ratios of the mobile stations joining in the specific multicast group, and output the calculated variation and an ID of a mobile station corresponding to the lowest signal-to-interference ratio, to the transmission method changing unit 140.

Only when the variation exceeds a predetermined value, the communication quality acquiring unit 130 may output the variation to the transmission method changing unit 140.

The communication quality acquiring unit 130 can set the average value or the lowest signal-to-interference ratio as a reference value, and output the signal-to-interference ratio in which a difference from the reference value is in a predetermined range and an ID of a mobile station corresponding to the signal-to-interference ratio, to the transmission method changing unit 140.

The communication quality acquiring unit 130 can set the average value or the lowest signal-to-interference ratio as a reference value, and output an ID of a mobile station extracted by using an optional method with the reference value and the signal-to-interference ratio of the extracted mobile station, to the transmission method changing unit 140.

For example, the communication quality acquiring unit 130 can extract the number N of mobile stations selected in sequence from a mobile station of the smallest signal-to-interference ratio, the number N of mobile stations selected in sequence from a mobile station whose signal-to-interference ratio is closest to an average value, a mobile station with an N-th smallest signal-to-interference ratio.

In addition, only when the number of mobile stations corresponding to the signal-to-interference ratio in which a difference from the reference value is in the predetermined range exceeds a predetermined number, the communication quality acquiring unit 130 may output the signal-to-interference ratio and the ID of the mobile station corresponding to the signal-to-interference ratio, to the transmission method changing unit 140.

The communication quality acquiring unit 130 may calculate an average value of communication qualities based on the communication qualities obtained from the mobile stations 200a to 200l, and output a difference between the calculated average value and a preset reference value to the transmission method changing unit 140.

The transmission method changing unit 140 is configured to change a transmission method for at least one of an error encoding rate, the number of repeated bits, an interleave length, the number of multiple codes and the number of transmission signal repetitions, in accordance with the communication quality outputted from the communication quality acquiring unit 130.

When the transmission method changing unit 140 receives the lowest or highest communication quality from the communication quality acquiring unit 130, the transmission method changing unit 140 changes the transmission method in accordance with the received communication quality.

In such a case, the transmission method changing unit 140 instructs the transmitting and receiving unit 110 to transmit signals to the mobile stations 200a to 200l which have the lowest or highest communication qualities by the changed transmission method.

Upon reception of an average value of the communication qualities from the communication quality acquiring unit 130, the transmission method changing unit 140 calculates a difference between the average value and a preset reference value, and changes the transmission method in accordance with the calculated difference.

In such a case, the transmission changing unit 140 instructs the transmitting and receiving unit 110 to transmit signals to the mobile stations 200a to 200l by the changed transmission method.

Specifically, the transmission method changing unit 140 changes the error encoding rate in accordance with the communication quality transmitted from the communication quality acquiring unit 130.

Generally, error correction codes such as convolutional codes or Turbo codes are added to a transmitted signal as redundancy bits. Therefore, the error encoding rate is calculated by "signal/(signal+redundancy bit)."

For example, when two redundancy bits (error correction codes) are added to a one-bit signal, an error encoding rate becomes ⅓.

When the error encoding rate is increased, a signal length is shortened, but an ability to correct errors is reduced. On the other hand, when the error encoding rate is reduced, a signal length becomes longer, but the ability to correct errors increases.

The transmission method changing unit 140 uses the above principle to reduce an error encoding rate for a mobile station of a low communication quality, and to increase an error encoding rate for a mobile station of a high communication quality, based on the communication quality transmitted from the communication quality acquiring unit 130.

For example, when the lowest received power and an ID of a mobile station 200 corresponding to the lowest received power are outputted from the communication quality acquiring unit 130, the transmission method changing unit 140 specifies the mobile station 200. Herein, for example, when a desired received power is not obtained at the specified mobile station 200, the transmission method changing unit 140 reduces the error encoding rates for all the mobile stations 200a to 200l joining in a specific multicast group.

When the highest received power and an ID of a mobile station 200 corresponding to the highest received power are outputted from the communication quality acquiring unit 130, the transmission method changing unit 140 specifies the mobile station 200. Herein, for example, when a communication quality of the specified mobile station 200 is equal to or higher than a desired communication quality, the transmission method changing unit 140 increases the error encoding rates for all the mobile stations 200a to 200l joining in a specific multicast group.

The transmission method changing unit 140 can change the number of repeated bits in accordance with a communication quality outputted from the communication quality acquiring unit 130.

The repeated bit means a bit repeatedly added to a signal which is to be transmitted, based on a given rule. That is, the repeated bit means a bit for reducing bit errors.

When the number of repeated bits is increased, a signal length becomes longer, but an ability to correct errors increases. On the contrary, when the number of repeated bits is reduced, a signal length is shortened, but the ability to correct errors increases.

The transmission method changing unit 140 uses the above principle to add more repeated bits when a communication quality is low, and to reduce the number of repeated bits when a communication quality is high, based on the communication quality of the mobile station 200 transmitted from the communication quality acquiring unit 130.

The transmission method changing unit 140 can change an interleave length in accordance with a communication quality outputted from the communication quality acquiring unit 130.

Generally, when the interleave length is longer, an ability to correct errors by the error correction codes is increased for burst errors.

The transmission method changing unit 140 uses the above principle to lengthen the interleave length when a communication quality is low, and to shorten the interleave length when a communication quality is high, based on the communication quality of the mobile station 200 transmitted from the communication quality acquiring unit 130.

As a result, the transmission method changing unit 140 can enhance real-time performance when a predetermined signal is transmitted.

The transmission method changing unit 140 can change the number of multiple codes in accordance with a communication quality outputted from the communication quality acquiring unit 130.

At the base station 100, in the case of multiplexing a signal by a code division multiple access (CDMA) system, when the number of multiple codes for multiplexing common information transmitted in multicast communication is increased, the number of bits to be transmitted is increased, and thus more new redundancy bits can be added.

On the other hand, when a signal other than the common information, e.g., a voice or other data, is multiplexed together with the common information by the CDMA system, the base station 100 can improve a communication quality by reducing the number of codes allocated to other services or not multiplexing other services themselves.

The transmission method changing unit 140 uses the above principle to increase the number of multiple codes when a communication quality is low, and to reduce the number of multiple codes when a communication quality is high, based on the communication quality of the mobile station 200 transmitted from the communication quality acquiring unit 130. Therefore, when a predetermined signal is transmitted, sufficient resources can be made available, and a communication quality at each of the mobile stations 200a to 200l can be improved.

The transmission method changing unit 140 can change the number of transmission signal repetitions in accordance with a communication quality outputted from the communication quality acquiring unit 130.

The base station 100 can transmit a signal (transmission signal) to be transmitted through the transmitting and receiving unit 110 repeatedly at each given cycle, in order to transmit the transmission signal to the mobile station 200 accurately.

As a result, the base station 100 can increase redundancy of information by increasing the number of transmission signal repetitions, so that the mobile station 200 can accurately receive the information transmitted from the base station 100 and further improve a communication quality.

The transmission method changing unit 140 uses the above principle to increase the number of transmission signal repetitions when a communication quality is low, and to reduce the number of transmission signal repetitions when a communication quality is high, based on the communication quality of the mobile station 200 outputted from the communication quality acquiring unit 130.

As a result, the transmission method changing unit 140 can adjust communication qualities of all the mobile stations joining in a specific multicast group by increasing or reducing the number of transmission signal repetitions, based on the communication quality of the mobile station 200 outputted from the communication quality acquiring unit 130.

When an average value of the received powers of the mobile stations joining in a specific multicast group exceeds a predetermined value, and the average value is received by the communication quality acquiring unit 130, the transmission method changing unit 140 can change the error encoding rate, the number of repeated bits, the interleave length or the number of multiple codes, in accordance with the average value.

As a result, the transmission method changing unit 140 can finely change the signal transmission method in accordance with the communication qualities of a plurality of mobile stations joining in a specific multicast group, so that the transmission method changing unit 140 can adjust the communication qualities of all the mobile stations 200 joining in the specific multicast group using the changed signal transmission method.

The transmission method changing unit 140 may use one or more of the transmission methods of the error encoding rate, the number of repeated bits, the interleave length, the number of multiple codes, etc. Accordingly, the transmission method changing unit 140 can adjust the communication qualities of all the mobile stations 200 using the plurality of transmission methods.

The transmission method changing unit 140 may change the transmission method based on the communication quality and a status of radio resources managed by a radio resource managing unit 160.

The transmission information database 150 is configured to store a signal to be transmitted to a mobile station.

The radio resource managing unit 160 is configured to manage a situation of radio resources. For example, the radio resource managing unit 160 manages radio resources managed by the base station 100a in the area 300a, currently available radio resources (e.g., the number of radio channels or transmission power) in the area 300a.

The embodiment has been described by way of example in which the base station is provided with the transmitting and receiving unit 110, the communication quality database 120, the communication quality acquiring unit 130, the transmission method changing unit 140, the transmission information database 150, and the radio resource managing unit 160.

However, the present invention is not limited to this example. All the functions may be provided to the radio network controller 50. Alternatively, parts of the functions may be provided to the radio network controller 50, and the remaining parts of the functions may be provided to the base station 10a.

<An Operation of the Mobile Communication System of the Embodiment>

An operation of the mobile communication system having the foregoing configuration will be described by referring to FIG. 5. FIG. 5 is a flowchart showing the operation of the mobile communication system according to the above embodiment.

As shown in FIG. 5, in step S101, the communication measuring unit 230 of each of the mobile stations 200a to 200l measures communication qualities of signals received from the base station 100a.

Then, the communication measuring unit 230 of each of the mobile stations 200a to 200l transmits the measured communication qualities to the transmitting and receiving unit 110 of the base station 100a through the transmitting and receiving unit 210.

In step S102, the transmitting and receiving unit 110 of the base station 100a obtains the communication qualities measured by the mobile stations 200a to 200l to store in the communication quality database 120.

The communication quality acquiring unit 130 selects one communication quality (e.g., "received power") from the plurality of communication qualities, and outputs the selected communication quality to the transmission method changing unit 140.

For example, the communication quality acquiring unit 130 selects the lowest received power or the like from among the received powers corresponding to the mobile stations joining in a specific multicast group, and outputs the selected lowest received power to the transmission method changing unit 140.

In step S103, the transmission method changing unit 140 changes at least one of the error encoding rate, the number of repeated bits, the interleave length, the number of multiple codes, and the number of transmission signal repetitions, as the transmission method, in accordance with the communication quality outputted from the communication quality acquiring unit 130.

For example, when an average value of the received powers received from the communication quality acquiring unit 130 exceeds a predetermined value, the transmission method changing unit 140 changes the error encoding rate, the number of repeated bits, the interleave length, or the number of multiple codes, in accordance with the level of the communication quality of the mobile station 200.

In step S104, the transmitting and receiving unit 110 transmits a signal to the mobile station 200 (e.g., mobile station joining in the specific multicast group) by the changed transmission method.

<Functions and Effects of the Mobile Communication System According to the Embodiment>

According to the mobile communication system of the embodiment, the transmission method changing unit 140 changes the transmission method including the error encoding rate etc., in accordance with a communication quality of each of the mobile stations 200a to 200l, so that the transmission method can be determined for a signal to be transmitted in consideration of a balance of communication qualities among the mobile stations 200a to 200l.

According to the mobile communication system of the embodiment, the transmission method changing unit 140 can select the lowest communication quality from among the communication qualities of the mobile stations 200a to 200l, and can change the transmission method in accordance with the selected communication quality, so that it is possible to improve the communication quality of the mobile station 200 which cannot satisfy a desired communication quality.

According to the mobile communication system of the embodiment, the transmission method changing unit 140 can select the highest communication quality from among the communication qualities of the mobile stations 200a to 200l, and can change the transmission method in accordance with the selected communication quality, so that the excessive communication quality of a mobile station can be prevented, and it is possible to improve the overall communication quality of the mobile station 200 existing within an area other than the area within which the mobile stations 200a to 200l exist.

Furthermore, according to the mobile communication system of the embodiment, the transmission method changing unit 140 can calculate a difference between an average value of the communication qualities of the mobile stations 200a to 200l and the preset reference value, and can change the transmission method in accordance with the calculated difference, so that it is possible to adjust the communication qualities of all the mobile stations 200a to 200l joining in a specific multicast group.

As described above, the present invention can approximate communication quality of each mobile station to desired communication quality by changing a transmission method for transmitting common information in consideration of a balance of communication quality among mobile stations, and can improve a communication quality of the mobile communication system as a whole.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A mobile communication system which carries out multicast communication, comprising:
   a first radio station configured to carry out the multicast communication with a first mobile station belonging to a specific multicast group;
   a second radio station configured to carry out the multicast communication with a second mobile station belonging to the specific multicast group,
   wherein each of the first and second mobile stations include a communication quality measurer configured to measure a communication quality of a signal transmitted from each of the first and second radio stations, respectively; and
   the first radio station comprises:
   a communication quality acquirer configured to acquire the communication quality from the first mobile station belonging to the specific multicast group, acquire a communication quality of a signal transmitted from the second radio station to the second mobile station belonging to the specific multicast group, and select the lowest communication quality from among the acquired communication qualities;
   a transmission method changer configured to determine a number of transmission signal repetitions by the multicast communication, in accordance with the selected lowest communication quality; and
   a transmitter configured to transmit the multicast communication to the first mobile station using the determined number of transmission signal repetitions.

2. A radio station for carrying out multicast communication with a first mobile station belonging to a specific multicast group, the radio station comprising:
   a communication quality acquirer configured to acquire, from the first mobile station a communication quality of a signal transmitted from the radio station to the first mobile station, acquire a communication quality of a signal transmitted from a different radio station to a second mobile station belonging to the specific multicast group, and select the lowest communication quality from among the acquired communication qualities;
   a transmission method changer configured to determine a number of transmission signal repetitions by the multicast communication, in accordance with the selected lowest communication quality; and
   a transmitter configured to transmit the multicast communication to the first mobile station using the determined number of transmission signal repetitions.

3. A radio station for carrying out multicast communication with a first mobile station belonging to a specific multicast group, the radio station comprising:
   a communication quality acquirer configured to acquire, from the first mobile station a communication quality of a signal transmitted from the radio station to the first mobile station acquire, from a different radio station, a communication quality of a signal transmitted from the second radio station to a second mobile station belonging to the specific multicast group, and calculate an average value of the communication qualities acquired;
   a transmission method changer configured to determine a number of transmission signal repetitions by the multicast communication, in accordance with a difference between the calculated average value and a preset reference value; and
   a transmitter configured to transmit the multicast communication to the first mobile station using the determined number of transmission signal repetitions.

4. The radio station according to claim 2 or 3 further comprising:
   a radio resource manager configured to manage radio resources of the radio station, wherein the transmission method changer determines the number of transmission signal repetitions in accordance with the acquired communication qualities and the situation of a radio resource.

5. The radio station according to claim 2 or 3, wherein the communication qualities include at least one of a received power, a signal error rate, an interference signal level and a signal-to-interference ratio.

6. A mobile communication method for carrying out multicast communication, comprising:
   acquiring, at a first radio station, a communication quality of a signal transmitted from the first radio station to a first mobile station belonging to a specific multicast group;
   acquiring, at the first radio station, a communication quality of a signal transmitted from a second radio station to a second mobile station belonging to the specific multicast group;
   selecting a lowest communication quality from among the acquired communication qualities;
   determining, at the first radio station, a number of transmission signal repetitions by the multicast communication, in accordance with the selected lowest communication quality; and transmitting the multicast communication from the first radio station to the first mobile station using the determined number of transmission signal repetitions.

7. A mobile communication system which carries out multicast communication, comprising:
a first radio station configured to carry out the multicast communication with a first mobile station belonging to a specific multicast group;
a second radio station configured to carry out the multicast communication with a second mobile station belonging to the specific multicast group,
wherein each of the first and second mobile stations include a communication quality measurer configured to measure a communication quality of a signal transmitted from each of the first and second radio stations, respectively; and
the first radio station comprises:
a communication quality acquirer configured to acquire the communication quality from the first mobile station belonging to the specific multicast group, acquire from the second radio station, a communication quality of a signal transmitted from the second radio station to the second mobile station belonging to the specific multicast group, and calculate an average value of the communication qualities acquired;
a transmission method changer configured to determine a number of transmission signal repetitions by the multicast communication, in accordance with a difference between the calculated average value and a preset reference value; and
a transmitter configured to transmit the multicast communication to the first mobile station using the determined number of transmission signal repetitions.

8. A mobile communication method for carrying out multicast communication, comprising:
acquiring, at a first radio station, a communication quality of a signal transmitted from the first radio station to a first mobile station belonging to a specific multicast group;
acquiring, at the first radio station, from a second radio station, a communication quality of a signal transmitted from the second radio station to a second mobile station belonging to the specific multicast group;
calculating an average value of the communication qualities acquired;
determining, at the first radio station, a number of transmission signal repetitions by the multicast communication, in accordance with a difference between the calculated average value and a preset reference value; and
transmitting the multicast communication from the first radio station to the first mobile station using the determined number of transmission signal repetitions.

* * * * *